Oct. 21, 1969 R. B. HOWELL 3,473,498
ZIPPER FOOT ATTACHMENT
Filed Oct. 27, 1967 3 Sheets-Sheet 1
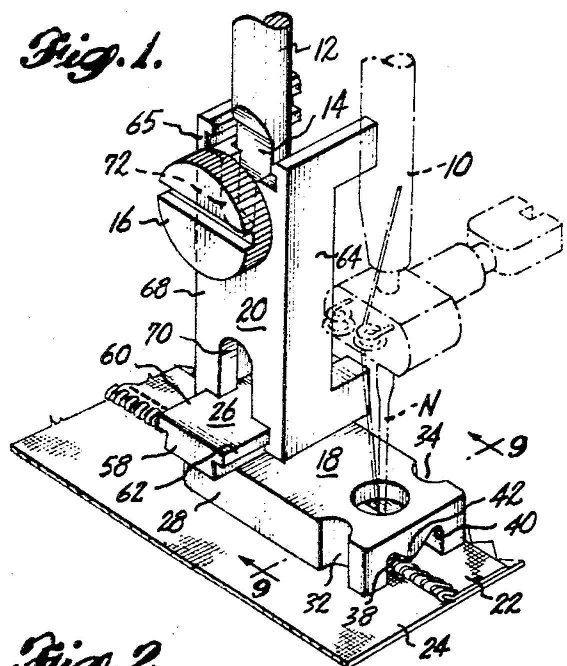
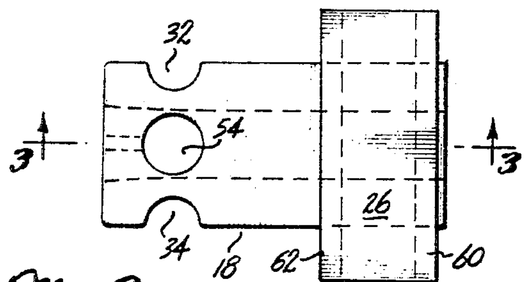
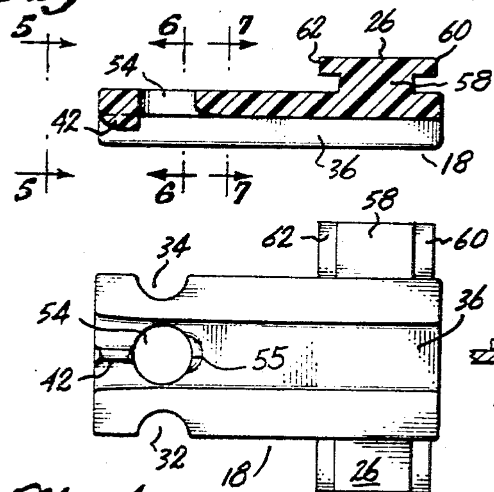
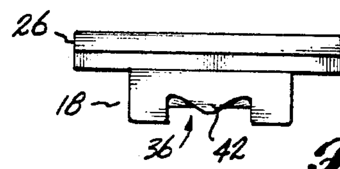
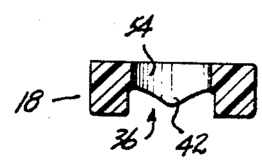
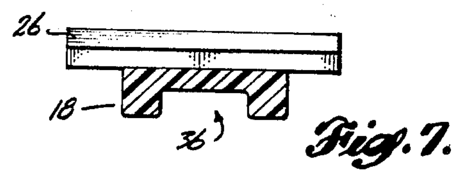
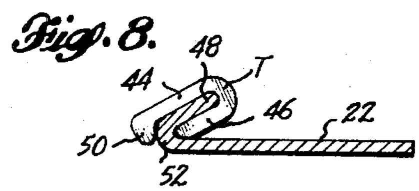
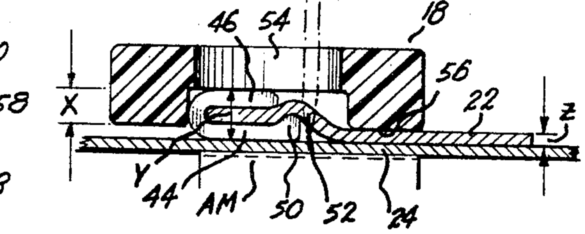
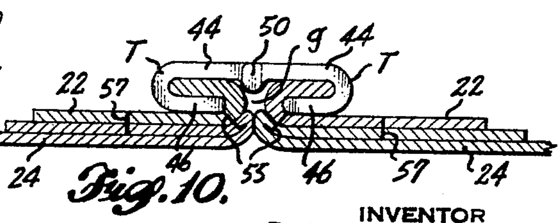
INVENTOR
ROBERT B. HOWELL
BY Graybeal, Cole & Barnard
ATTORNEYS Oct. 21, 1969 R. B. HOWELL 3,473,498

ZIPPER FOOT ATTACHMENT

Filed Oct. 27, 1967

INVENTOR
ROBERT B. HOWELL
BY Graybeal, Cole & Barnard
ATTORNEYS

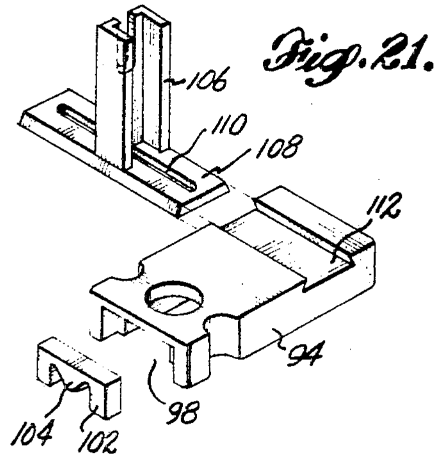
Fig. 21.
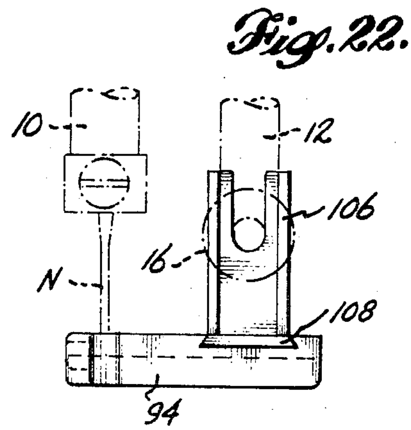
Fig. 22.
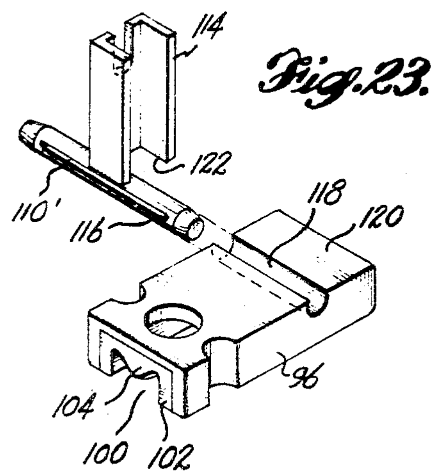
Fig. 23.
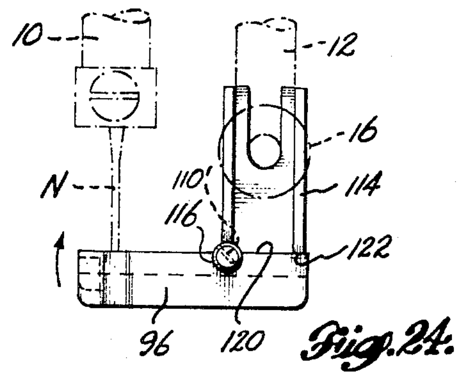
Fig. 24.
Fig. 25.
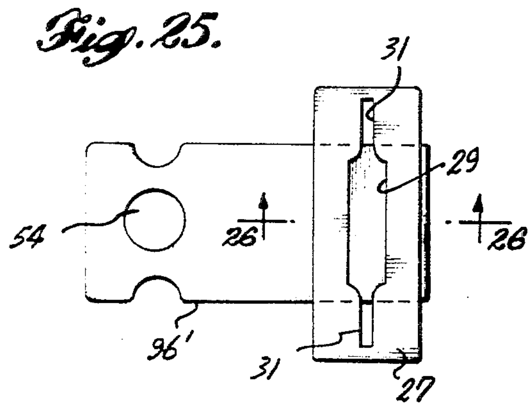
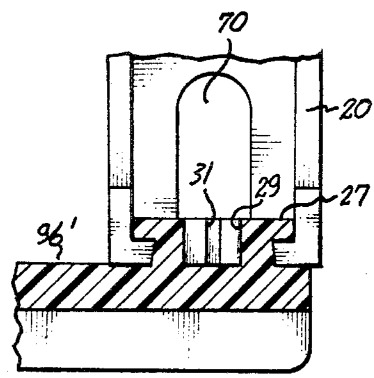
Fig. 26.
INVENTOR
ROBERT B. HOWELL
BY Graybeal, Cole & Barnard
ATTORNEYS United States Patent Office 3,473,498
Patented Oct. 21, 1969

3,473,498

ZIPPER FOOT ATTACHMENT

Robert B. Howell, 2115 Madrona Point Drive, Bremerton, Wash. 98310

Continuation-in-part of application Ser. No. 501,066, Oct. 22, 1965. This application Oct. 27, 1967, Ser. No. 678,742
Int. Cl. D05b 29/06, 29/12
U.S. Cl. 112—240 19 Claims

ABSTRACT OF THE DISCLOSURE

Rolling the teeth of a concealed zipper tape from their natural orientation over into a supine position and guiding them through the sewing area so positioned, and stitching through the tape closely adjacent the connector end portions of the teeth. A presser foot with a bottom groove shaped to so position and guide the teeth. Presser feet including a bottom groove and a selective usable insert for varying the lateral configuration of the groove. A transverse slide bar at the lower end of a mounting shank and transverse slide way formed in the upper heel portion of the foot component.

CROSS-REFERENCE TO RELATED APPLICATIONS

This is a continuation-in-part of my copending application Ser. No. 501,066, entitled Zipper Foot Attachments and filed Oct. 22, 1965, and now Patent No. 3,349,736, as a continuation-in-part of my earlier application Ser. No. 475,486, filed July 28, 1965, entitled Universal Presser Foot Attachment, and now U.S. Patent No. 3,342,151, issued Sept. 19, 1967.

BACKGROUND OF THE INVENTION

Field of the invention

The present invention relates to a technique and apparatus for installing a concealed zipper in a manner such that the closed zipper forms a tight seam between the two pieces of fabric joined by the zipper. It also relates to presser foot mounting and guiding features.

Description of the prior art

McNamara U.S. Patent No. 3,011,459 discloses a sewing machine comprising cooperating grooves in a presser foot and in the top of the machine, together forming guide channels for guiding the zipper teeth through the needle area in an outwardly leaning attitude. This orientation makes it possible to stitch relatively close to the connector end portions of the zipper teeth, but it requires a special construction of sewing machine. Stitching close to the connector end portions is desirable because the stitch line establishes the position of the fold formed in the fabric to which the zipper tape is sewn. Location of the fold close to the connector end portions of the teeth makes a tight seam between the two pieces of fabric joined by the zipper.

SUMMARY OF THE INVENTION

This invention provides a technique and presser foot attachments for stitching close to the connector end portions of the zipper teeth on a conventional flat (i.e. not grooved in the needle area) sewing machine.

According to the technique, the zipper teeth are rolled over from their natural inwardly leaning attitude into a supine position and are guided through the sewing area while so positioned. One form of presser foot includes a bottom groove of a height throughout most of its length that is substantially equal to the thickness or minor dimension of the zipper teeth, and a shaped entrance into the grove which twists or rolls the teeth over into a supine position in which they closely match in height the depth of the groove. While in a supine position the relatively long side portions of the teeth are pressed upon top and bottom by wide area portions of the groove's roof and the sewing machine top. This prevents them from rolling into a different attitude. The foot is mounted for lateral adjustment relative to the needle so that the connector end portions of the teeth can be positioned closely adjacent the needle.

Another form of presser foot of the present invention has a shaped exit, or a downward projection somewhere along the length of the groove rearwardly of the front end. This is to provide a part of the presser foot which extends downwardly along side of the string of teeth on the side thereof opposite the side of the groove, to prevent the teeth from rolling out from their supine position during vertical bouncing of the presser foot by the advance mechanism.

Yet another form of presser foot includes a foot component with a full length bottom groove and selectively usable inserts for changing the lateral configuration of the groove, so that the same foot, altered only by the insert, can be used for guiding several types of thick line projections (e.g. zipper teeth chains, cording, tapes, etc.) through the needle area. One type of insert is positionable through a top opening and another is fittable into the forward end portion of the groove.

The invention also relates to friction grip type slide mounts for a presser foot, including such a mount which also permits limited pivotal movement of a foot relative to its shank.

These and other objects, features, and advantages of the present invention will be apparent from the following description, appended claims and annexed drawing.

BRIEF DESCRIPTION OF THE DRAWING

Referring to the drawing, wherein like reference characters designate like parts in the several views:

FIG. 1 is a fragmentary perspective view taken in the needle region of a sewing machine, such view showing a zipper foot attachment constructed according to the present invention installed in an operative position for sewing a tape of a concealed zipper, and showing the needle and needle bar assembly in phantom;

FIG. 2 is a top plan view of the foot component portion of the attachment shown by FIG. 1;

FIG. 3 is a longitudinal sectional view taken substantially along line 3—3 of FIG. 2;

FIG. 4 is a bottom plan view of the foot component shown by FIGS. 1–3;

FIG. 5 is a front elevational view of the foot component shown by FIGS. 1–4, taken substantially from the aspect of line 5—5 of FIG. 3;

FIG. 6 is a transverse sectional view taken substantially along line 6—6 of FIG. 3, and showing the rear side of the divider in elevation;

FIG. 7 is a transverse sectional view taken substantially along line 7—7 of FIG. 3, showing the lateral configuration of the central groove in its extent rearwardly of the divider;

FIG. 8 is a transverse sectional view taken across one side portion or tape of a concealed zipper, showing the teeth components thereof disposed in their natural attitude;

FIG. 9 is a transverse sectional view taken substantially along line 9—9 of FIG. 1, and showing how the foot component of FIG. 1 functions to orient and then hold the teeth elements in a supine position during their travel over the advancing mechanism;

FIG. 10 is a transverse sectional view taken across a coupled zipper assembly that has been installed according to the technique of the present invention;

FIG. 21 is an isometric view of a foot component having a slide mount comprising a dove-tail groove formed in the upper portion of the foot component and a slide bar of a complementary cross section secured to the lower end of the mounting shank;

FIG. 22 is a side elevational view of the zipper foot attachment shown by FIG. 21, and showing the sewing machine needle, the needle bar, and the presser bar in phantom;

FIG. 23 is a view similar to FIG. 21, but of another form of slide mount;

FIG. 24 is a view like FIG. 22, but of the slide mount form of FIG. 25, such views showing that the slide mount also serves a second function of a pivot joint for permitting an upward pivotal movement of the toe portion of the foot component;

FIG. 25 is a top plan view of still another form of slide mount, involving a slide bar on the foot component having a longitudinal center slot formed in it to render it somewhat yieldable when pressed inwardly; and FIG. 26 is a view like FIG. 24, but of the slide mount form shown by FIG. 25, such view showing the slide bar in section, with the section being taken substantially along line 26—26 of FIG. 25.

Referring more specifically to the several views of the drawing, FIG. 1 shows a reciprocating needle bar 10 (in phantom) spaced forwardly of a presser bar 12 of the upright high bar type. Bar 12 is equipped with a slide clamp type of presser foot mounting mechanism, designated 16. The mounting mechanism comprises a flat side surface 14 formed on the lower end portion of bar 12, a threaded aperture entering into the side of said lower portion, substantially perpendicularly to both the surface 14 and the sewing path, and said clamp screw 16. Surface 14 is substantially parallel to the plane in which the sewing path is located. Clamp screw 16 has a large head, with a flat inner surface that is parallel to surface 14, and a threaded shank that is threadable into and out from said aperture for the purpose of varying the distance between surface 14 and the inner surface of the head of clamp screw 16.

Figure 11:
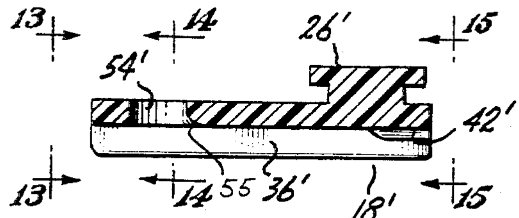
FIG. 11 is a longitudinal sectional view of a modified form of foot component constructed for practicing the technique of the present invention.
Figure 13:
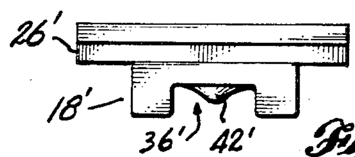
FIG. 13 is a front elevational view of the foot component shown by FIGS. 11 and 12.
Figure 12:
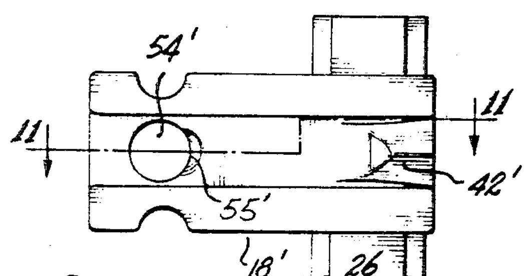
FIG. 12 is a bottom plan view at the foot component shown by FIG. 11.
Figure 14:
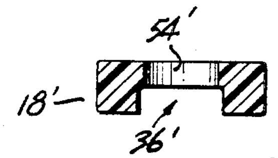
FIG. 14 is a transverse sectional view of the foot component shown by FIGS. 11–13, taken substantially along line 14—14 of FIG. 11.
Figure 15:
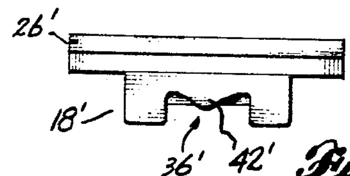
FIG. 15 is a rear end elevational view of the foot component shown by FIGS. 11–14, taken substantially from the aspect of line 15—15 of FIG. 11.

The zipper foot attachment shown by FIG. 1 consists of two interlocking parts, a foot component 18 and a mounting shank 20. The foot component is shown to be positioned for sewing a tape 22 of a concealed zipper to a piece of material 24. A material advance mechanism (see FIG. 9) is located below the material 24 and below that part of component 18 which rests on and presses downwardly against the tape 22.

Foot component 18 is shown to be constructed in two parts. The first part is the foot itself, which is illustrated as having rectangular proportions. The second part is an elongated slide bar 26 which is secured to the upper surface of the rear portion of the foot, and with said rear portion forms the heel of the foot component 18.

The foot component 18 may be provided with side guide surfaces 28, 30, usable as guides for the sewing of the tapes of visible or exposed zippers, as explained in my aforementioned U.S. Patent No. 3,342,151. The guide surfaces 28, 30 are parallel and may be planar and vertically disposed, as illustrated. A needle receiving recess 32 is formed in surface 28 and a like recess 34 is formed in surface 30.

The bottom of foot component 18 is formed to include a centrally disposed longitudinal groove 36. At its forward end the groove 36 is divided into two entrances 38, 40 by a divider 42 depending from the roof of the groove 36.

FIG. 8 shows the natural orientation of the zipper teeth T of a separated zipper string relative to its fabric tape 22. Each tooth T includes an elongated inner portion 44 and a somewhat shorter outer portion 46. Each tooth T is generally of a U shape with the turned in edge portion 48 of the tape 22 being secured between its inner and outer side portions 44, 46. The teeth T may be individual elements clamped to the inner edge portion 48 of the tape 22, or they may be portions of a continuous metal, plastic or nylon spiral type string that is sewn or otherwise secured to the inner edge portion 48. The connector end portion 50 of the side portion 44 which is nearest the fold 52 in the tape 22 is fashioned to interlock with like portions of teeth T carried by the other half of the zipper. During the manufacturing of the zipper strings a set is placed in the folds 52 so that the teeth T are oriented relative to the tape 22 substantially in the manner illustrated by FIG. 8, i.e. the inner and outer sides 44, 46 of the teeth T make an acute angle to the inner surface of the tape 22.

According to the present invention the zipper teeth T are rolled over into a supine position, with the inner side portions of the teeth T resting flat on the fabric to which the tape 22 is to be sewn, and are held in that position during the sewing step. Placement of the teeth T in a supine position requires a counterclockwise rolling (as shown by FIG. 8) of the teeth T from their natural attitude to the supine position. According to the present invention, the entrance avenue 38 of the foot component 18 starts the teeth T into the bottom groove at an attitude that is about midway between the natural attitude of the teeth (the FIG. 8 position) and the supine position. As shown by FIG. 9, at and rearwardly of the needle aperture 54 the height $x$ of the bottom groove is substantially equal to the minor dimension or thickness $y$ of the teeth T minus the thickness $z$ of the tape 22. The entrance avenue 38 gradually decreases in height along a descending diagonal path until it merges into the flat roof portion of the center groove 36, so that the remainder of the rolling or twisting of the teeth into supine positions is accomplished between the entrance of the avenue 38 and the groove 36 in the region at the forward portion of the needle receiving aperture 54.

As shown by FIGS. 5 and 6, the divider 42 projects down below the level of the flat roof portions of the groove 36. As shown by FIG. 9, the flat bottom surface 56 of the foot component 18 rides over and exerts a holding pressure on the fabric tape 22.

As shown by FIG. 9, placement of the teeth T in supine positions generally straightens out the fold region 22. Prior to sewing the foot component is moved laterally relative to its mounting shank 20 so as to place the needle in as close as possible to the coupler end portions 50 of the teeth T. The stitch line between the tape 22 and the fabric 24 establishes the location of the fold in the fabric 24. Placement of the stitching as near as possible to the connector end portions 50 in turn places the fold in the fabric 24 generally in the cleft formed by the zipper tapes of the seam. As shown by FIG. 10, showing a zipper coupled and assembled onto a fabric fronting, a slight gap *g* exists or can be made to exist between the two folds 52 of the tapes 22. However, the folds in the material 24 are located in the space *g*.

The slide mount that is illustrated in connection with this form of the invention is of a type to which my aforementioned Patent No. 3,342,151 relates. Slide bar 26 is shown to be composed of a stem portion 58 and a top flange formed by a pair of laterally protruding lips 60, 62 (FIG. 3, for example). This gives slide bar 26 a T-shape in cross-section which is substantially uniform throughout the length of slide bar 26. It may be said that slide bar 26 has a relatively narrow lower portion (stem 46) and a relatively wide upper portion (the top flange composed of 46 plus the lips 48, 50).

Referring to FIG. 1, the mounting shank 20 is shown to be of channel form and to comprise a pair of spaced apart flanges 64, 66 and a web 68 interconnected between corresponding edges of the flanges 64, 66. At least the lower end of web 56 is provided with an end surface adapted to slidably abut against the side portions of the upper surface of the slide bar 26. The end portions of web 56 are each formed to include an outwardly opening blind slot. These slots, designated 70, 72, are colinearly related. At the lower end of shank 20 the end portions of the flanges 64, 66 extend beyond the end of the web 20 an amount substantially to the depth of slide bar 26. The end portions of the flanges 64, 66 are in effect tines or slide parts of a spring clamp. Each is provided with a groove in its inner surface for receiving one of the slide bar lips 60, 62.

At at least the lower end of the mounting shank 20 the interiorly grooved end portions of the flanges 64, 66 and the end surfaces of web 68 adjacent thereto, together define a slideway for the slide bar 26. Such slideway has a cross-sectional shape that is substantially identical to the cross-sectional shape of the slide bar, but is slightly undersized in comparison to the slide bar. Therefore, the end portions of the flanges 64, 66 must be sprung apart slightly to allow entry of the slide bar 26 into the slideway. This assures a tight fit and results in the slide bar being frictionally retained in any position which it is set. It also permits easy repositioning of the foot component 18 relative to mounting shank 20. The operator need only exert an endwise force on the slide bar 26 of sufficient magnitude to overcome the friction forces. For and a more detailed description of the mounting apparatus for the foot component 18, reference is made to my aforementioned prior Patent No. 3,342,151.

Figure 16:
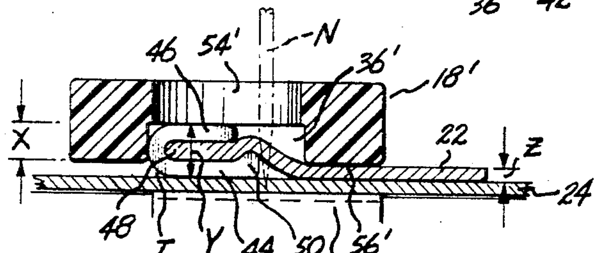
FIG. 16 is a view similar to FIG. 9, showing the foot component of FIGS. 11–15 holding the zipper teeth in a supine position over the advancing mechanism.
Figure 17:
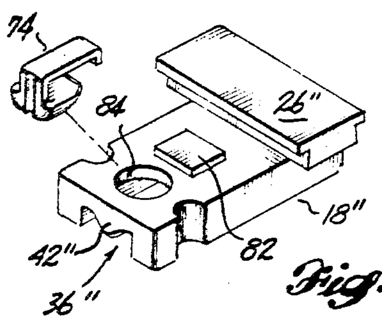
FIG. 17 is an isometric view of a third form of foot component constructed according to the present invention, such foot component including a deep bottom channel provided with an insert which includes a lower portion which when installed protrudes downwardly from the roof of the channel, at a position rearwardly of the needle aperture, to contact and hold the zipper teeth in a near supine position during sewing, such view showing the insert spaced upwardly of its position of use.

Reference is now made to FIGS. 11–16, relating to a modified form of the foot component, designated 18'. As best shown by FIG. 16, this form of the foot component 18' also includes a flat roofed bottom groove 36' that is of a depth such that it maintains the teeth T supine in their travel relatively through the groove 36', while maintaining pressure at surface 56' on the tape 22. Foot component 18' is provided with a divider 42' located at the rear end of the bottom groove 36'. A divider somewhere along the length of the bottom groove 36' was found necessary because of the tendency of the foot component 18' to bounce up in response to an upward component of force exerted on it by the advance mechanism AM. Without a divider it was found that at times the zipper teeth T would roll back up towards their natural attitude as pressure was released from them during the bouncing.

Figure 18:
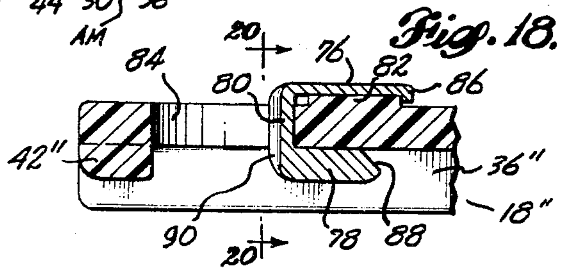
FIG. 18 is a fragmentary longitudinal sectional view, taken substantially along line 18—18 of FIG. 19, and showing the insert frictionally secured in its position of use.
Figure 20:
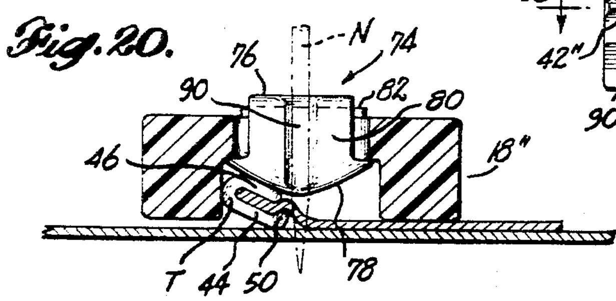
FIG. 20 is a transverse sectional view taken substantially across line 20—20 of FIG. 18, and showing the effect of the lower portion of the insert on the orientation of the zipper teeth passing through the groove.
Figure 19:
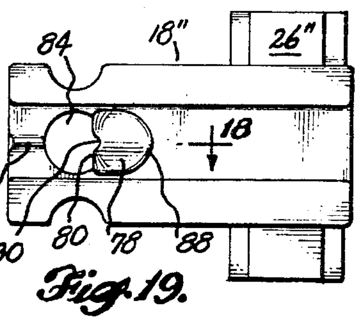
FIG. 19 is a bottom plan view of the foot component assembly of FIGS. 17 and 18.

FIGS. 17–20 relate to another form of foot component, composed of a foot component of the type disclosed in my copending application Ser. No. 501,066 and an insert element 74. The insert 74 is generally of U-shape in longitudinal profile. It comprises an upper portion 76 which when the insert is installed it is disposed above the top of the foot component 18'', a lower horizontal portion 78 which is disposed below such top and depends downwardly from the roof of the channel 36'', and a generally vertical interconnecting bight portion 80. The foot component 18'' may include a raised portion 82 on its top spaced rearwardly somewhat from the needle receiving aperture 84. Such raised portion 82 may serve as a location for a trademark. As shown by FIG. 18, the upper portion 76 of the insert 74 is recessed intermediate its ends to receive the slightly raised area 82. It includes a free end portion 84 which hooks about the rear edge of the area 82 and helps secure the insert 74 in place. The lower portion 78 has a generally prow shaped forward portion, and throughout its length has a somewhat rounded V or shallow arch cross-sectional configuration. The rear end 86 is beveled for the purpose of facilitating placement and removal of the insert 74 through the opening 84. As clearly shown by FIGS. 19 and 20, the vertical portion 80 is centrally grooved to at 90 to provide clearance for the needle. As shown by FIG. 20, the prow shape of the forward end portion 80 of the insert 74 serves to cam the zipper teeth T into a leaning position in their passage through the region of the needle end. Substantial contact is made between the sloping side surface of the bottom portion 78 of the insert 74 and the portions 46 of the teeth T. This pressure holds the teeth in substantially the position illustrated. Inward sliding of the teeth is prevented by the insert since it projects downwardly in the central portion of the groove a distance sufficient to reduce the depth of the groove in such region to where it is less than the minor dimension of the teeth T. The foot component is moved relative to the needle end so that the stitching is done along a line contiguous the connector elements 50 of the zipper teeth T. The forward divider 42'' serves to channel the teeth T into the bottom groove, but does not orient them into the desirable position for sewing. Preferably, the rear surface of the vertical portion 80 is of convex curvature which closely matches the concave curvature of the rear portion of opening 84.

FIGS. 21 and 23 show a modified form of insert, designated 92. Further forms of inserts include a full length insert for a large bottom groove. In these illustrations the foot components 94, 96 are substantially like the foot component disclosed by FIGS. 16–20 of my copending application Ser. No. 501,066, except for the construction of the slide mount means which will hereinafter be described in greater detail. The channels 98, 100 are substantially flat roofed and have two substantially vertical sides. A recess of a width and height slightly larger than the bottom channel 98, 100 is formed in the front end portion of the foot components 94, 96. An insert 102 carrying a divider 104, or the like is provided to snap into the forward end recess. Each foot component 94, 96 may be provided with a plurality of inserts 104, each having a somewhat different shaped divider, so as to exert a different orientation influence on the zipper or a similar bead or elongated raised element being sewn to a piece of fabric. Different size inserts may be provided for different sizes of zippers. Also, an insert may be provided for use in sewing cording or tape onto a fabric.

In the embodiments of FIGS. 21–24, the slide bar is shown attached to the lower end of the mounting shank and the slideway is shown in the nature of a lateral groove formed in the upper heel portion of the foot component. In the embodiment of FIGS. 21 and 22, the slide bar 108 is in the form of a flat bar, having side edges which are beveled in a manner making its top narrower than its bottom. The slide bar 108 is secured intermediate its length to the lower end of a mounting shank 106, and it includes a longitudinal center slit 110 which extends throughout a major portion of the length of the slide bar 108. The slit 110 makes the slide bar 108 laterally compressible or springy. In order for the central portion of the bar 108 to spring inwardly, it may be necessary to fasten the mounting shank 106 to only one side portion of the bar 108, leaving the other side unfastened. Since the slot 110 does not extend clear out to the ends of the bar 108, it may be necessary to slightly taper the end portions of the bar 108, for easy starting of the bar 108 into the slideway 112. As clearly shown by FIGS. 21 and 22, the slideways 112 has a cross-sectional configuration that is substantially identical to the cross section of the slide bar 108. However, it is slightly undersized in relationship to the portion of the slide bar 108 in the regions of the slit 110, so that a slight amount of compression of the slide bar 108 is necessary in order for it to fit within the slideway 112. This creates a frictional gripping force between the side parts of the slideway and the side parts of the slide bar 108, making it possible to get the foot component 94 into an infinite number of positions relative to the shank 106, merely by pressing sideways on the foot component 94 a sufficient amount to overcome the friction forces and allow the slide bar 108 to move endwise relatively through the slideway 112.

The slide bar in the embodiment of FIGS. 23 and 24 has a circular cross sectional configuration, and also includes a longitudinal slit 110′, for making it laterally compressible. It is shown attached to the lower forward end portion of the mounting shank 114. As shown by FIG. 24, when the foot component 96 is connected to the mounting shank 114, the lower surface 122 of the mounting shank 114 normally rests on the upper heel surface 120 of the foot component 96. However, the foot component is free to pivot upwardly at its front or toe end when forced in that direction. It merely rotates about the slide bar 116.

The embodiment shown by FIGS. 25 and 26 includes a slide mount means which is basically like that shown by FIG. 1. However, the slide bar 27 is longitudinally split and the split includes a relatively wide center portion 29 and narrower end portions 31. This split is also provided for making the slide bar 27 laterally compressible. The wide central part 29 makes the bar compressible in such regions even though it is secured to the foot component 99. Referring to FIG. 29, the lower end of the mounting shank 20 includes a blind slot 70 which makes the lower end portion or tines of the shank somewhat springy themselves. However, in this form of the invention the tines can be somewhat rigid and will still function as a spring clamp, with the transversely compressible slide bar 27 being the springy element which develops at least most of the friction forces.

What is claimed is:

1. A zipper foot attachment for a sewing machine, comprising: a foot component having a longitudinal bottom groove of a depth throughout at least a part of its length that is substantially equal to the thickness dimension of the teeth of a concealed zipper minus the thickness dimension of the tape to which the teeth are secured, and of a width wider than the length dimension of said teeth, said groove having a generally flat roof and generally straight side wall portions, and a substantially vertical needle receiving opening extending vertically through the foot component wherein the groove depth is as described above, said opening being substantially centered laterally with respect to the groove, and being wider than the length of the zipper teeth.

2. A zipper foot attachment according to claim 1, wherein said foot component includes a generally flat, tape and fabric pressing bottom surface outwardly of the bottom groove on at least the tape side thereof.

3. A zipper foot attachment according to claim 1, further comprising slide mount means mounting the foot component in a manner permitting lateral adjustment of the foot component relative to the needle.

4. A zipper foot attachment according to claim 1, further comprising a downwardly projecting divider dividing the bottom groove into separate zipper teeth guide avenues, with the guide avenues including roof portions of a lateral configuration such that the zipper teeth are guided through them in a leaning position with the fold partially unfolded.

5. A zipper foot attachment according to claim 4, wherein the downwardly projecting divider is located at the entrance of the groove.

6. A zipper foot attachment according to claim 4, wherein the downwardly projecting divider is located near the exit of the groove.

7. A presser foot attachment for a sewing machine, comprising: a foot component having a longitudinal bottom groove and a needle receiving opening extending downwardly through the foot component into the bottom groove, and an insert including a lower portion insertable into the bottom channel through said opening, a generally parallel upper portion positionable atop the foot component, and an interconnecting portion that is generally vertically positioned in the hole when the insert is in place, with the lower portion being laterally curved to change the lateral configuration of the bottom groove.

8. A presser foot attachment according to claim 7, wherein the upper and lower portions of the insert frictionally grip the portion of the foot component located between them.

9. A presser foot attachment according to claim 7, wherein said vertical portion of the insert includes a generally vertical recess in its surface facing into the opening, for accommodating a portion of the needle.

10. A presser foot attachment for a sewing machine, comprising: a foot component having a longitudinal bottom groove the forward portion of which is enlarged to form a socket, and an insert comprising a member insertable into said socket and spanning laterally across at least a portion of said bottom groove, said member including guiding avenue forming means of a different lateral configuration than the bottom groove.

11. A presser foot attachment for a sewing machine equipped with a pressure bar, a material advance mechanism, and a reciprocating needle bar and needle assembly, said attachment comprising: a presser foot component having a plurality of laterally-spaced, parallel, selectively usable use positions, and including one component of a two component slide mount means; and a mounting shank connectible to the presser bar, and including a lower end portion carrying a second component of said slide mount means, with said slide mount means and said mounting shank serving to mount the foot component onto the presser bar in a position over the material advance mechanism, and with said slide mount means mounting said foot component onto said mounting shank in a manner permitting lateral adjustment of said foot component on said mounting shank, relative to the needle, with one of said components of the slide mount means consisting of a transverse slide bar that is slotted at least throughout a greater portion of its length, so as to make it laterally compressible, and with the second component of the slide mount means being a transverse slideway for receiving said slide bar, with said slideway being slightly undersized in comparison to said slide bar, so that it is necessary to slightly compress the slide bar in order to slide it endwise relatively through said slideway, resulting in the slide bar being frictionally gripped by the slideway to retain the foot component in each selected position of use, but permitting the foot component to be moved laterally relative to the needle when it is subjected to a lateral force of sufficient magnitude to overcome the friction force.

12. A presser foot attachment according to claim 11, wherein the slide bar is substantially longer than the foot component is wide.

13. A presser foot attachment according to claim 11, wherein the transverse slideway is formed in the foot component and the transverse slide bar is located at the lower end of the mounting shank.

14. A presser foot attachment according to claim 11, wherein the transverse slide bar is secured to the foot component and the transverse slideway is formed by and between a pair of spaced apart tines at the lower end of the mounting shank.

15. A presser foot attachment according to claim 13, wherein the slide bar is generally circular in cross section and is connected at a location intermediate its ends to a lower front portion of the mounting shank, and the slideway in the foot component also has a generally circular cross section and breaks through the upper surface of the foot component, with the shank including a lower surface which substantially contacts the upper surface of the foot component rearwardly of the slideway, and with said component being free to pivot upwardly at its forward end about the transverse slide bar when forced in that direction.

16. A presser foot attachment for a sewing machine equipped with a presser bar, a material advance mechanism, and a reciprocating needle bar and needle assembly, said attachment comprising: a presser foot component having a plurality of laterally-spaced, parallel, selectively usable use positions, and including one component of a two component slide mount means; and a mounting shank connectible to the presser bar, and including a lower end portion constituting a second component of said slide mount means, with said slide mount means and said mounting shank serving to mount the foot component onto the presser bar in a position over the material advance mechanism, and with said slide mount means mounting said foot component onto said mounting shank in a manner permitting lateral adjustment of said foot component on said mounting shank, relative to the needle, said first component of the slide mount means consisting of a transverse slide bar secured to the foot component, said slide bar including a longitudinal slit extending throughout the greater portion of its length, and being narrower at its bottom than at its top, said second component of the slide mount means being a friction clamp formed by a pair of spaced apart side parts at the lower end of the mounting shank, defining a transverse slideway therebetween, said slideway having a transverse shape that is substantially identical to the transverse shape of the slide bar, with the slideway being slightly undersized in comparison to said slide bar, and said slide bar being resilient enough, due to the presence of the slit, to compress slightly and allow passage of the slide bar endwise relatively into said slideway, with said friction clamp frictionally gripping the slide bar and serving to frictionally retain the foot component in each selected position of use, but permitting the foot component to be moved laterally relative to the needle when it is subjected to a lateral force of sufficient magnitude to overcome the friction forces, and with at least a portion of the friction forces being developed by the compressed slide bar.

17. A zipper foot attachment for a sewing machine, for use in installing concealed zippers of a type having folded tapes and chains with generally flat and parallel sides and a rounded free edge, said attachment comprising: a foot component including a longitudinal bottom groove having a roof and generally flat side wall portions extending throughout a substantial portion of its length, a substantially vertical needle receiving opening extending vertically through the foot component, a generally flat tape and fabric pressing bottom surface located laterally outwardly of the bottom groove on at least the tape side thereof, and a downward projection adjacent said needle receiving opening, including a generally flat roof surface for contacting the upwardly facing, generally flat side surface of the zipper chain, said roof surface declining laterally from a high point adjacent one of the side walls of the bottom groove to a low point spaced laterally from said high point, with said declining roof surface and said side wall of the bottom groove serving to guide the zipper chain through the needle region in an outwardly leaning position relative to the tape with the fold in its tape partially unfolded and with the rounded free edge of the chain making only a low friction line contact with said generally flat side wall, said bottom groove roof being spaced above the declining roof surface of said projection in the region of said bottom groove located rearwardly of said projection.

18. A presser foot attachment for a sewing machine equipped with a presser bar, a material advance mechanism, and a reciprocating needle bar and needle assembly, said attachment comprising: a presser foot component having a plurality of laterally-spaced, parallel, selectively usable use positions, and including one component of a two component slide mount means; and a mounting shank connectible to the presser bar, and including a lower end portion carrying a second component of said slide mount means, with said slide mount means and said mounting shank serving to mount the foot component onto the presser bar in a position over the material advance mechanism, and with said slide mount means mounting said foot component onto said mounting shank in a manner permitting lateral adjustment of said foot component on said mounting shank, relative to the needle, with one of said components of the slide mount means consisting of a transverse slide bar located at the lower end of the mounting shank, and with the second component of the slide mount means being on said foot component and constituting a transverse slideway for receiving said slide bar, said slideway being slightly undersized in comparison to said slide bar and being defined by spaced apart side walls, and with said slide mount means having lateral resiliency, resulting in the slide bar being frictionally gripped by the side walls of the slideway to retain the foot component in each selected position of use, but permitting the foot component to be moved laterally relative to the needle when it is subjected to a lateral force of sufficient magnitude to overcome the friction force.

19. A presser foot attachment according to claim 18, wherein the slide bar is substantially longer than the foot component is wide and said foot component includes a pair of parallel side guide surfaces, each being formed to include a vertical needle receiving recess near its forward end.

References Cited

UNITED STATES PATENTS

| | | | |
|---|---|---|---|
| 2,706,460 | 4/1955 | Grossman | 112—235 |
| 3,342,151 | 9/1967 | Howell | 112—235 |
| 3,349,736 | 10/1967 | Howell | 112—235 |

FOREIGN PATENTS

| | | |
|---|---|---|
| 1,161,113 | 1/1964 | Germany. |

PATRICK D. LAWSON, Primary Examiner